United States Patent [19]

Layton

[11] 4,297,745

[45] Oct. 27, 1981

[54] GAIN RANGING AMPLIFIER

[75] Inventor: James E. Layton, Ochelata, Okla.

[73] Assignee: Phillips Petroleum Company, Bartlesville, Okla.

[21] Appl. No.: 955,903

[22] Filed: Oct. 30, 1978

[51] Int. Cl.³ .......................... G01V 1/22; H03F 1/02
[52] U.S. Cl. ...................................... 367/66; 367/98; 330/9
[58] Field of Search ............................ 367/65, 66, 98; 364/421, 571; 330/9, 289; 323/22; 340/347 CC

[56] References Cited

U.S. PATENT DOCUMENTS

| | | | |
|---|---|---|---|
| 3,241,100 | 3/1966 | Loafbourrow | 367/66 |
| 3,671,931 | 6/1972 | Loafbourrow | 367/66 |
| 3,681,703 | 8/1972 | Johnson | 330/9 |
| 3,748,587 | 7/1973 | Aumiaux | 330/9 |
| 3,771,038 | 11/1973 | Rubis | 330/9 |
| 3,860,168 | 1/1975 | Byrd et al. | 364/571 |
| 3,919,685 | 11/1975 | Haill | 367/65 |
| 4,121,294 | 10/1978 | Galanis et al. | 364/571 |
| 4,150,433 | 4/1979 | Kaniel | 364/571 |

FOREIGN PATENT DOCUMENTS 311373  11/1971  U.S.S.R. .................................. 330/9

OTHER PUBLICATIONS

Jaeger et al., "Dynamic Zero Correction . . . in Op Amps", 12/4/72, Electronies, pp. 109-110.
Walton, "Analog Amplifier . . . Zero Correction", 8/72, pp. 757-758, IBM Tech. Disc. Bull., vol. 15, #3.

*Primary Examiner*—Nelson Moskowitz

[57] ABSTRACT

A gain ranging amplifier system is provided for use in the acquisition of data. Voltage offset compensation is utilized to correct errors in the gain ranging amplifier system caused by thermal drift and temperature dependent voltage offsets, both of which are associated with amplifiers in the gain ranging amplifier system.

10 Claims, 4 Drawing Figures

GAIN RANGING AMPLIFIER

This invention relates to method and apparatus for amplifying an electrical analog signal. In a particular aspect, this invention relates to method and apparatus for amplifying an electrical analog signal wherein voltage offset compensation is used to improve the accuracy and versatility of the amplification circuit.

With the increased use of digital computers, it is becoming increasingly necessary to be able to convert analog signals into digital signals. It may be that the dynamic range of the analog signals is too great for an analog-to-digital conversion system to handle. When this occurs, some means must be provided to compress the dynamic range of the analog signals. This is particularly true with respect to seismic exploration systems.

The seismic method of mapping geological subsurfaces of the earth involves the use of a source of seismic energy and reception of reflected seismic energy by an array of seismic detectors, generally referred to as geophones. When used on land, the source of seismic energy generally is a high explosive charge electrically detonated in a bore hole located at a selected grid point in a terrain or is an energy source capable of delivering a series of impacts to the earth's surface such as that used in a Vibroseis system. The acoustic waves generated in the earth by the explosion or impacts are reflected back from pronounced strata boundaries and reach the surface of the earth after varying intervals of time, depending on the distance and the nature of the subsurface traversed. These returning acoustic waves are detected by the geophones, which function to transduce such acoustic waves into representative electrical analog signals. The plurality of geophones are arrayed in a selected manner to detect most effectively the returning acoustic waves and generate electrical analog signals representative thereof from which data may be deduced concerning the geological subsurface of the earth.

The analog signals which are representative of the seismic waves sensed by the geophone arrays have a very large dynamic range. In order to process these analog signals and convert them to digital signals, it is necessary to compress the analog signals to reduce the dynamic range. Gain ranging amplifiers are commonly used in seismic exploration to provide the required compression.

Amplifiers such as operational amplifiers are commonly used in gain ranging amplifier systems to provide the required amplification of the seismic signal. These amplifiers are ordinarily arranged in stages with the number of amplifiers used to amplify the seismic signal being determinative of the voltage level of the amplified seismic signal.

It is well known that analog amplifiers have a small voltage, which is referred to as an offset voltage, that effectively appears between the two input terminals of the analog amplifiers. This so-called offset voltage is temperature dependent and produces an output from the analog amplifiers even if no signal is being applied to the analog amplifiers. It is desirable to be able to operate a seismic exploration system in many different environments in which the ambient temperature to which the seismic exploration system, containing a gain ranging amplifier system, is exposed may vary greatly. Exploration for oil or gas is conducted in arctic areas as well as in tropical areas. If some means is not provided for compensating for the temperature dependent offset voltage, associated with the analog amplifiers used in a gain ranging amplifier system, then errors will occur in the seismic data which is being acquired and consistent results will not be obtainable where the temperature, to which the seismic exploration system is exposed, varies.

The gain ranging amplifier systems which are used in seismic exploration are often associated with remote data acquisition units which are completely battery operated. It is thus desirable to be able to supply power to the gain ranging amplifier system only when data is being acquired and processed through the gain ranging amplifier system. However, it may take some time for an analog amplifier to temperature stabilize once power is applied and thus it is necessary to provide some means for compensating for changes in the output of an analog amplifier caused by thermal drift before the amplifier stabilizes. When the analog amplifier is not temperature stabilized a voltage may appear at the output of the amplifier even when no signal is being applied to the amplifier.

It is thus an object of this invention to provide method and apparatus for using a gain ranging amplifier system to amplify an electrical analog signal. It is a particular object of this invention to provide method and apparatus for utilizing a gain ranging amplifier system to amplify an electrical analog signal wherein voltage offset compensation is used to improve the accuracy and versatility of the gain ranging amplifier system.

In accordance with the present invention, a gain ranging amplifier circuit is provided in which two amplifier stages are used to provide the desired amplification for the seismic data sensed by the geophone arrays. The first amplifier stage contains a plurality of analog amplifiers in series. The voltage level of the output of each amplifier will thus be higher than the voltage level of the output from the preceding amplifier. In this manner a plurality of signals are provided from the first amplifier stage, each being representative of the seismic data acquired by the geophone arrays but each having a different voltage level. The output signal having the desired voltage level is selected and is supplied to the second stage amplifier which operates in essentially the same manner as the first stage amplifier. The seismic signal is further amplified in the second stage to provide a desired output signal which is both representative of the seismic data sensed by the geophone arrays and is suitable for converting to a digital format.

Before data is processed through the gain ranging amplifier system of the present invention, voltage offset compensation values are computed and stored in a computer memory to be used later in providing voltage offset compensation for the analog amplifiers in the first and second stages of the gain ranging amplifier system. The required voltage offset compensation value is determined by grounding the inputs to each of the amplifiers associated with the gain ranging amplifier system. The output of each amplifier is then converted to digital form and a voltage offset value is then computed for each of the amplifiers tested which, when applied to their respective inputs, will drive the output of the amplifiers to zero. Thus, when the voltage offset compensation values are provided to the input of the amplifiers, the output of the amplifiers will be essentially zero when no signal is applied to the input of the amplifiers.

Other objects and advantages of the invention will be apparent from the detailed description of the invention and the appended claims as well as from the detailed description of the drawings in which:

FIG. 2c is a schematic of the gain ranging amplifier system and the A/D conversion system illustrated in FIG. 2b.

Figure 1:
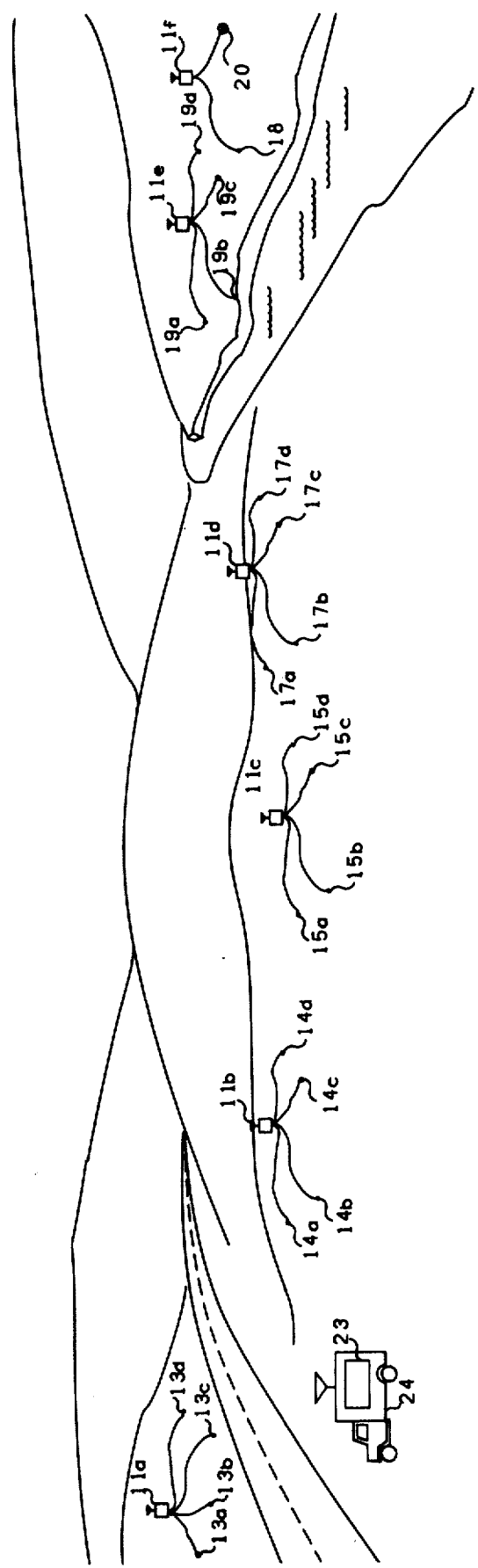
FIG. 1 is an illustration of a possible physical arrangement of the components of the seismic exploration system.
Figure 2A:
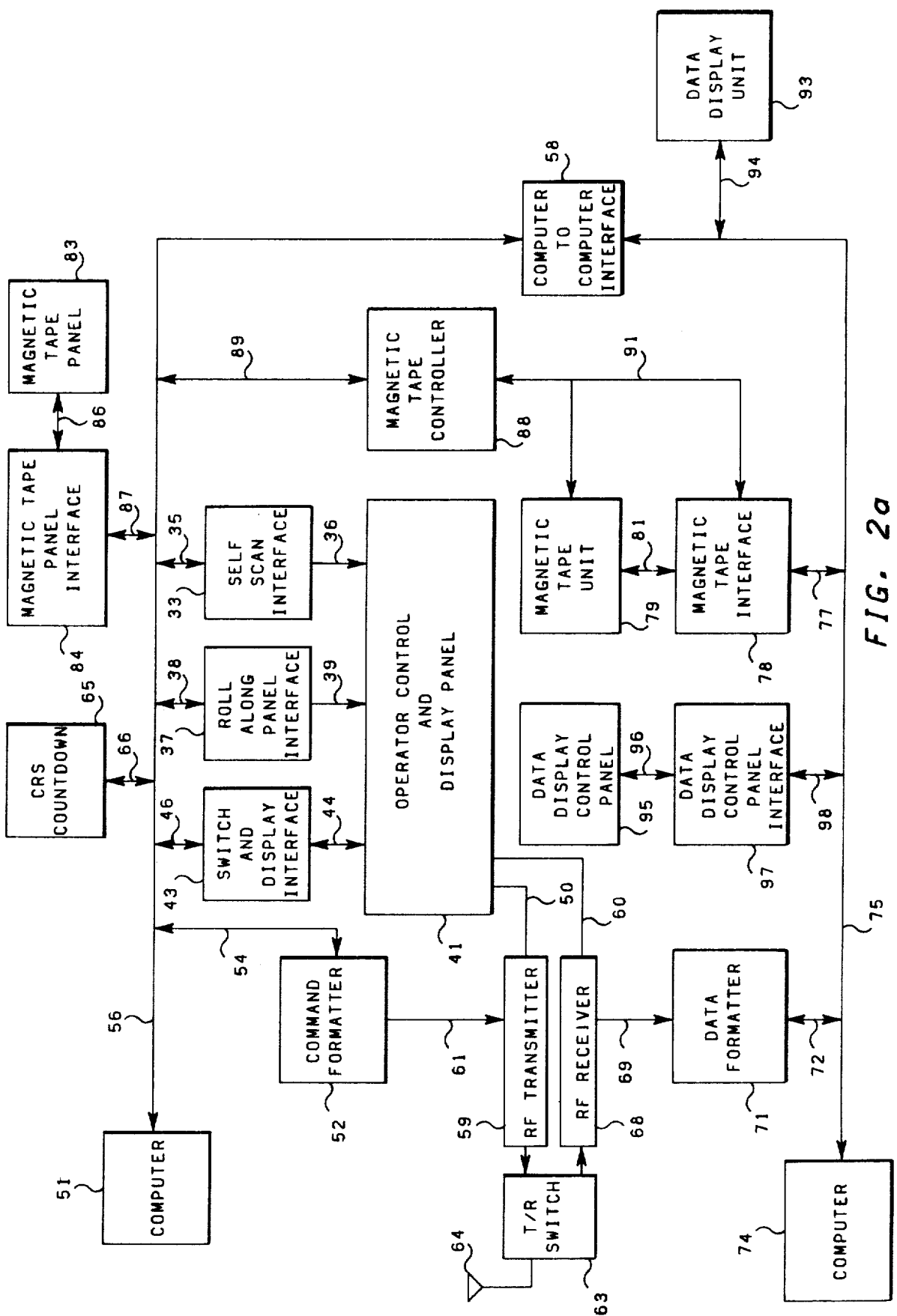
FIG. 2a is a block diagram of the central recording station.
Figure 2B:
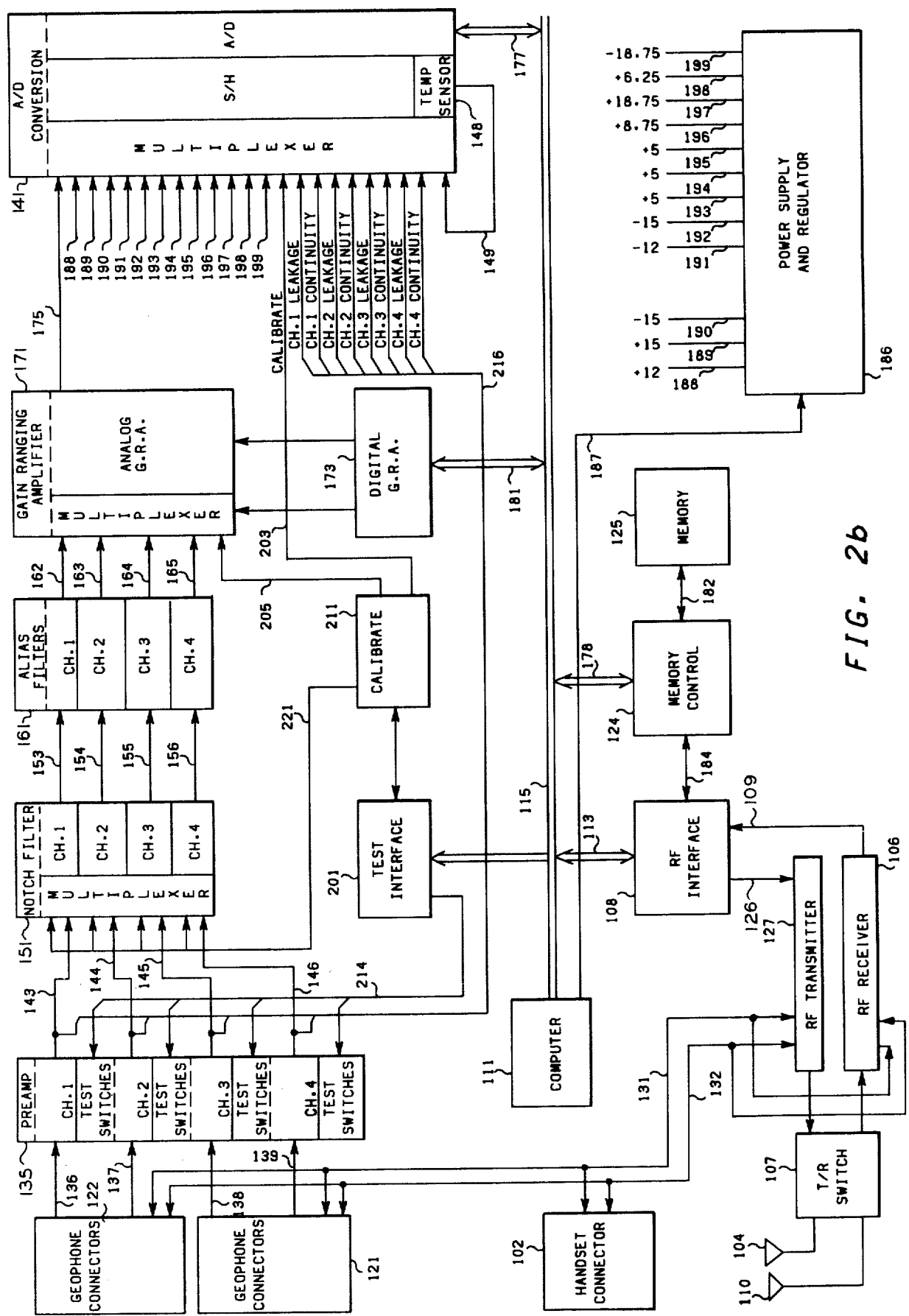
FIG. 2b is a block diagram of the remote telemetry unit.
Figure 20:
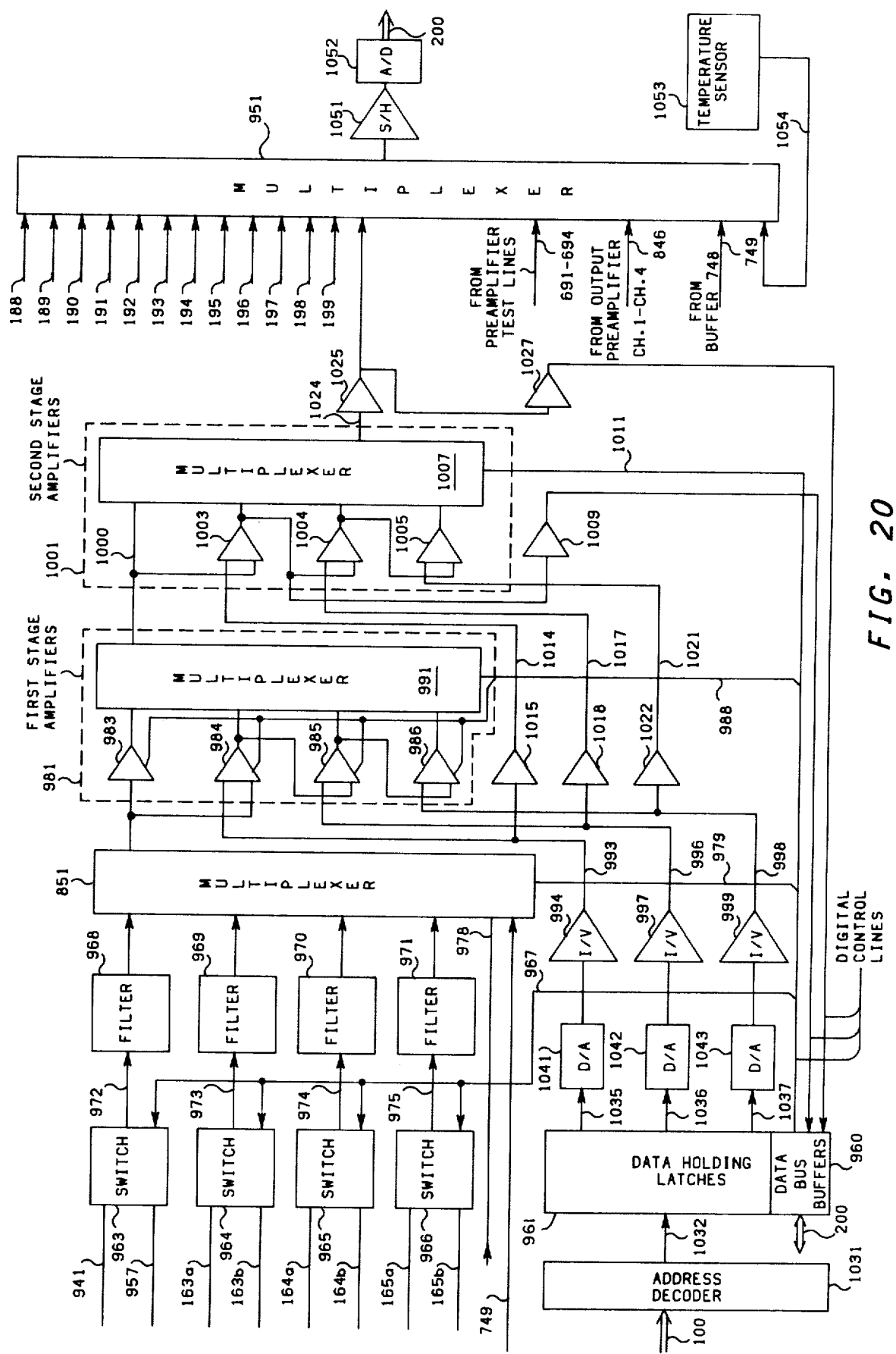

FIGS. 3-19 and 21-73 of application Ser. No. 955,905, filed Oct. 30, 1978, by Robert H. Lacy are hereby incorporated by reference. The brief description of FIGS. 3-19 and 21-73 in application Ser. No. 955,905 is also hereby incorporated by reference.

The invention is described in terms of a seismic exploration system but is applicable to other data acquisition systems or signal processing systems in which it is desired to compress the dynamic range of an analog signal.

In the preferred embodiment of the present invention, the computer used to calculate the voltage offset compensation values is a 6800 microprocesser system manufactured by Motorola Semiconductor. The invention, however, is not limited to this specific computer system but is rather applicable to other computer systems which could be utilized to calculate the voltage offset compensation values.

The invention is described in terms of a preferred embodiment in which four amplifiers are used in the first stage of a gain ranging amplifier system and three amplifiers are used in a second stage of a gain ranging amplifier system. However, the invention is not limited to a gain ranging amplifier system having these specific numbers of amplifiers and is not limited to a gain ranging amplifier system in which the gain of the amplifiers used is the same as the gain of the amplifiers set forth in the preferred embodiment of the present invention.

The detailed description of the drawings and the Appendix of application Ser. No. 955,905, filed Oct. 30, 1978, by Robert H. Lacy, are hereby incorporated by reference.

I claim:

1. In a seismic system for geophysical exploration comprising:

a plurality of remote geophone monitoring means, each of said remote geophone monitoring means being adapted to receive electrical signals from at least one geophone means; and a central control means for generating electrical signals for initiating the operation of said plurality of remote geophone means;

each of said plurality of remote geophone monitoring means comprising:

a gain ranging amplifier means having a plurality of amplifiers for compressing the dynamic range of electrical analog signals;

means for converting the compressed electrical analog signals into digital seismic data; and means for transmitting said digital seismic data to said central control means;

said central control means comprising:

means for transmitting commands to said plurality of remote geophone monitoring means; and means for receiving data from said plurality of remote geophone monitoring means;

the improvement comprising:

means for grounding the input of each one of said plurality of amplifiers for which a voltage offset compensation value is to be calculated;

an analog-to-digital conversion means;

a computer means;

means for providing the output of each one of said plurality of amplifiers, having the inputs thereof grounded, to said analog-to-digital conversion means to therein convert the output of said plurality of amplifiers to digital form;

means for providing the digital output of said analog-to-digital conversion means to said computer means to therein calculate a voltage offset compensation value for each of said plurality of amplifiers for which it is desired to calculate a voltage offset compensation value, each voltage offset compensation value having a voltage level which, if applied to the input of a respective one of said plurality of amplifiers for which the particular voltage offset compensation value was calculated, would drive the output signal from the respective one of said plurality of amplifiers to essentially zero when no electrical analog input signal is applied to the input of the respective one of said plurality of amplifiers;

a digital memory means associated with said computer means;

means for providing the calculated voltage offset compensation values for each of said plurality of amplifiers to said digital memory means;

a digital-to-analog converter means;

means for providing said calculated voltage offset compensation values from said digital memory means to said digital-to-analog converter means; and means for providing the particular voltage offset compensation value determined for a particular one of said plurality of amplifiers from said digital-to-analog converter means to that particular one of said plurality of amplifiers, said calculated voltage offset compensation values being transferred from said digital memory means to said digital-to-analog converter means when electrical analog input signals are applied to the input of at least one of said plurality of amplifiers and the particular voltage offset compensation value determined for a particular one of said plurality of amplifiers being transferred from said digital-to-analog converter means to that particular one of said plurality of amplifiers when an electrical analog input signal is applied to the input of that particular one of said plurality of amplifiers to thereby substantially reduce errors caused by voltage offset.

2. Apparatus in accordance with claim 1 wherein said means for providing the particular voltage offset compensation value determined for a particular one of said plurality of amplifiers from said digital to analog converter means to that particular one of said plurality of amplifiers comprises:

a current to voltage converter means;

means for supplying the output from said digital to analog converter means to said current to voltage converter means;

means for supplying the output of said current to voltage converter means to the particular one of said plurality of amplifiers.

3. Apparatus in accordance with claim 1 wherein said gain ranging amplifier system comprises a first amplifier stage having a plurality of sample and hold amplifiers and a second amplifier stage having a plurality of buffer amplifiers.

4. Apparatus in accordance with claim 3 wherein the particular voltage offset compensation value determined for a particular one of said sample and hold amplifiers is provided to the particular one of said sample and hold amplifiers when an electrical analog input signal is being sampled by said sample and hold amplifiers.

5. Apparatus in accordance with claim 4 wherein the particular voltage offset compensation value determined for a particular one of said bumper amplifiers is provided to the particular one of said buffer amplifiers after said sample and hold amplifiers have been set to a hold mode.

6. In a gain ranging amplifier system wherein a plurality of amplifiers are used to compress the dynamic range of electrical analog input signals, the improvement comprising:

means for grounding the input of each one of said plurality of amplifiers for which a voltage offset compensation value is to be calculated;

an analog-to-digital conversion means;

a computer means;

means for providing the output of each one of said plurality of amplifiers, having the inputs thereof grounded, to said analog-to-digital conversion means to therein convert the output of said plurality of amplifiers to digital form;

means for providing the digital output of said analog-to-digital conversion means to said computer means to therein calculate a voltage offset compensation value for each of said plurality of amplifiers for which it is desired to calculate a voltage offset compensation value, each voltage offset compensation value having a voltage level which, if applied to the input of a respective one of said plurality of amplifiers for which the particular voltage offset compensation value was calculated, would drive the output signal from the respective one of said plurality of amplifiers to essentially zero when no electrical analog input signal is applied to the input of the respective one of said plurality of amplifiers;

a digital memory means associated with said computer means;

means for providing the calculated voltage offset compensation values for each of said plurality of amplifiers to said digital memory means;

a digital-to-analog converter means;

means for providing said calculated voltage offset compensation values from said digital memory means to said digital-to-analog converter means; and means for providing the particular voltage offset compensation value determined for a particular one of said plurality of amplifiers from said digital-to-analog converter means to that particular one of said plurality of amplifiers, said calculated voltage offset compensation values being transferred from said digital memory means to said digital-to-analog converter means when electrical analog input signals are applied to the input of at least one of said plurality of amplifiers and the particular voltage offset compensation value determined for a particular one of said plurality of amplifiers being transferred from said digital-to-analog converter means to that particular one of said plurality of amplifiers when an electrical analog input signal is applied to the input of that particular one of said plurality of amplifiers to thereby substantially reduce errors caused by voltage offset.

7. Apparatus in accordance with claim 6 wherein said means for providing the particular voltage offset compensation value determined for a particular one of said plurality of amplifiers from said digital to analog converter means to that particular one of said plurality of amplifiers comprises:

a current to voltage converter means;

means for supplying the output from said digital to analog converter means to said current to voltage converter means;

means for supplying the output of said current to voltage converter means to the particular one of said plurality of amplifiers.

8. Apparatus in accordance with claim 6 wherein said gain ranging amplifier system comprises a first amplifier stage having a plurality of sample and hold amplifiers and a second amplifier stage having a plurality of buffer amplifiers.

9. Apparatus in accordance with claim 8 wherein the particular voltage offset compensation value determined for a particular one of said sample and hold amplifiers is provided to the particular one of said sample and hold amplifiers when an electrical analog input signal is being sampled by said sample and hold amplifiers.

10. Apparatus in accordance with claim 9 wherein the particular voltage offset compensation value determined for a particular one of said bumper amplifiers is provided to the particular one of said buffer amplifiers after said sample and hold amplifiers have been set to a hold mode.

* * * * *